F. WEGNER.
BEAN SNIPPER.
APPLICATION FILED JAN. 10, 1914.
1,155,455.
Patented Oct. 5, 1915.
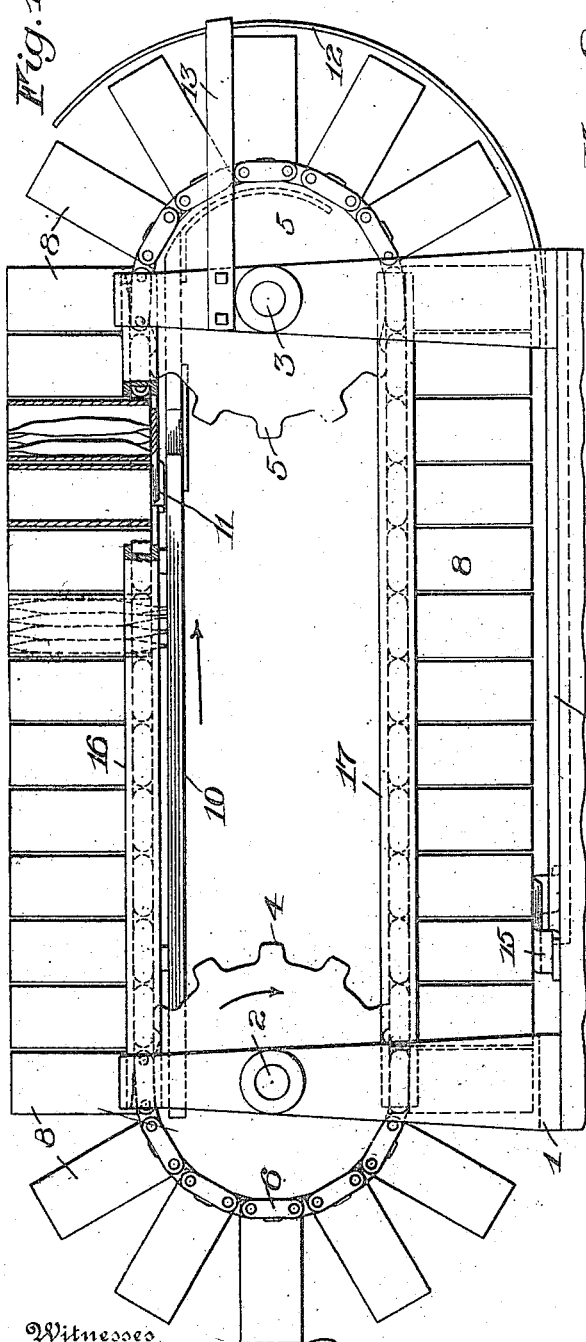
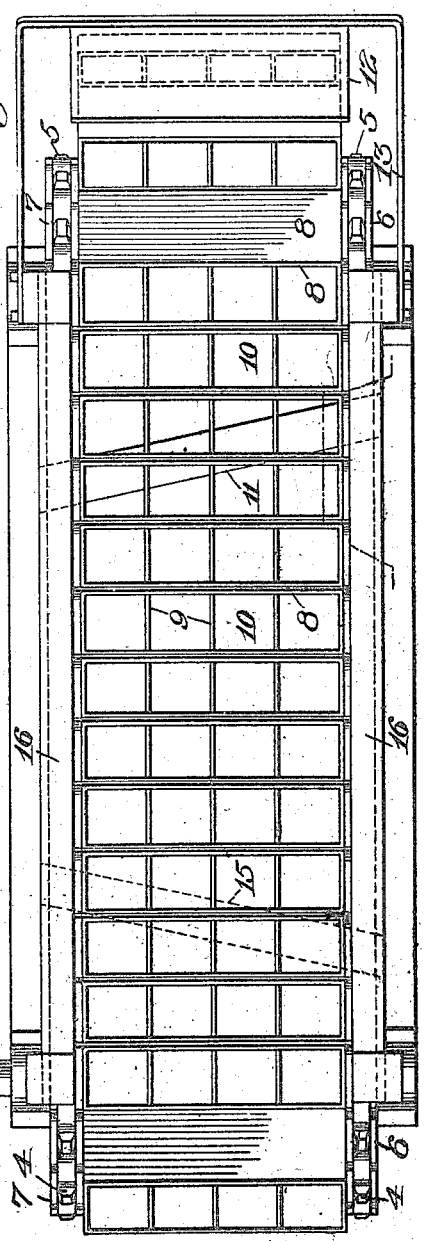
Inventor
Fred Wegner

UNITED STATES PATENT OFFICE.

FRED WEGNER, OF FAIRPORT, NEW YORK, ASSIGNOR TO GEO. W. COBB, OF NEW YORK, N. Y.

BEAN-SNIPPER.

1,155,455.   Specification of Letters Patent.   Patented Oct. 5, 1915.

Application filed January 10, 1914. Serial No. 811,293.

*To all whom it may concern:*

Be it known that I, FRED WEGNER, of Fairport, in the county of Monroe and State of New York, have invented certain new and useful Improvements in Bean-Snippers; and I do hereby declare the following to be a full, clear, and exact description of the same, reference being had to the accompanying drawings, forming a part of this specification, and to the reference-numerals marked thereon.

This invention relates to apparatus for cutting or trimming and particularly for performing such operations as snipping the ends of string beans as is usual in preparing the same for canning.

A prime object of the invention is to provide an improved apparatus of this character, which while exceedingly simple and inexpensive in construction is adapted to handle beans rapidly and present them in proper alinement automatically and with precision for action by the snipping cutters.

In a preferred embodiment of the invention I utilize the action of gravity in alining first one end and then the other of the beans for snipping, the beans being carried in holders by a conveyer mechanism that presents them upright with one end up to a cutter for snipping one end and then at a subsequent point of the conveyer's travel presents the beans turned over with their other ends up to a second cutter for snipping the remaining end. In connection with this mechanism I preferably provide alining barriers or backing plates on which the ends of the beans rest in the positions for snipping the respective ends.

The above and other objects and features of the invention will be better understood from the following detailed description taken in connection with the accompanying drawings, and will be therefore pointed out in the appended claim.

Referring to the drawings: Figure 1 is a side elevation of an apparatus constructed in accordance with my invention, a small part being broken away in section, and Fig. 2 is a plan of such apparatus.

Similar reference numerals in the several figures indicate the same parts.

Upon a suitable framework 1, I mount on journals 2 and 3, spaced apart pairs of sprocket wheels 4, 4 and 5, 5 on which are fitted at each side endless conveyer chains 6, 7; the sprocket wheels being disposed in approximately horizontal alinement so that the stretches of the chains between them extend horizontally. These chains as shown, have relatively long links and to each link is fixed at one side a bean holder 8, there being thus a series of these holders which set quite closely together on the horizontal stretch of the chains. These bean holders are of oblong form since the chains 6, 7 are spaced much farther apart than the width of the holders 8, and I therefore sub-divide said holders by transverse ribs 9 to form a series, shown as four, of pockets in the respective holders, each adapted to receive a limited number of beans and hold them upright. The bottoms of the holders 8 are open so that the beans as disposed therein when the pockets are upright on the upper horizontal stretch of the conveyer can drop therethrough until their lower ends come against an alining board or barrier 10 suitably mounted on the framework. The alining board 10 preferably extends substantially the entire length of the horizontal upper stretch of the conveyer so as to hold beans in any of the pockets along this stretch and it is positioned a distance below the bottoms of the pockets corresponding to the length of the bean ends to be removed. Near the forward end of the upper stretch of the conveyer I mount a suitable cutter shown as a diagonally arranged fixed knife 11 in position to snip off the bean ends preferably by a shearing action in coöperation with the bottoms of the pockets. The manner in which this cutter operates will be clearly understood from the broken away portion of Fig. 1. The beans thus snipped at one end are carried forward by the conveyer movement until they are turned around the sprocket wheels 5, 5 to an inverted position on the lower stretch of the conveyer.

To prevent the beans from dropping out of the pockets by gravity as they pass around the sprocket wheels 5, 5, I provide a guard plate 12 held by straps 13 to the framework and curved around so as to be in proximity to the outer ends of the pockets throughout their swinging movement. Extending beneath the line of pockets as they are carried on the lower horizontal stretch of the conveyer I mount an alining board or barrier 14 similar to the board 10 and at the proper distance from the outer ends of the pockets as determined from the amount to be snipped from the beans. The extent of this alining board in the line of the conveyer movement is sufficient to permit all the beans to be alined by gravity and at the outer end of the board I mount a cutter 15 similar to the cutter 11 and likewise adapted to snip the bean ends preferably by shearing and in coöperating with the outer ends of the pockets. As the beans thus snipped at both ends continue their movement they are discharged from the apparatus as the pockets are about to start on their return upward swing around the sprocket wheels 4, 4.

It is desirable for the correct and proper operation of the machanism that the conveyer in its horizontal stretches which present the beans to the shearing cutters should be moved in accurate and precise alinement so as to bring the bottoms and tops of the pockets into proper shearing relation to the respective cutters and for this purpose I provide guide bars 16, 17 carried by the framework and having guideways at their sides in which the sides of the respective chains are fitted so that they are caused to move therein with precision.

It is to be understood that there is no special significance in having the operative stretches of the conveyer arranged precisely or even nearly horizontal, the only requisite in this respect being that there be a horizontal extension of these parts of the conveyer either with or without a vertical direction component, sufficient to aline the beans in the holders by gravity. Further, while I show the bean holders as extending at right angles from the conveyer, it is to be understood that only such an angular disposition thereof is necessary as will insure the bean alinement in the manner described.

While the described embodiment of my invention is a simple and practicable one, I am aware that the principles of the invention can be embodied in varied structural forms and I therefore desire the present embodiment to be considered as illustrative and not restrictive, and refer to the appended claim rather than to the foregoing description to indicate the scope of the invention. Also while I refer in the description and claim to beans as the articles being treated I do not desire to be limited to this use of the invention but desire this reference to be considered as typifying any articles or commodity adapted to be handled in a manner analogous to the operation of bean snipping.

I claim as my invention:

A device of the kind described comprising an endless conveyer having upper and lower horizontally extending stretches, bean holders projecting transversely from said conveyer divided into a plurality of pockets of limited size to hold beans upstanding therein, said pockets having alining and cutting means coöperative therewith on the upper and lower stretches respectively for snipping the bean ends while held in upstanding position.

FRED WEGNER.

Witnesses:
ANNA P. WEGNER,
WALTER F. WEGNER.